(12) United States Patent
Hayakawa et al.

(10) Patent No.: US 7,344,765 B2
(45) Date of Patent: Mar. 18, 2008

(54) HEAT-SHRINKABLE POLYESTER FILM AND HEAT-SHRINKABLE LABEL

(75) Inventors: Satoshi Hayakawa, Inuyama (JP); Seizou Takabayashi, Inuyama (JP); Norimi Tabota, Inuyama (JP); Naonobu Oda, Inuyama (JP)

(73) Assignee: Toyo Boseki Kabushiki Kaisha, Osaka-shi (JP)

( * ) Notice: Subject to any disclaimer, the term of this patent is extended or adjusted under 35 U.S.C. 154(b) by 0 days.

(21) Appl. No.: 10/583,743

(22) PCT Filed: Dec. 22, 2004

(86) PCT No.: PCT/JP2004/019172

§ 371 (c)(1),
(2), (4) Date: Jun. 20, 2006

(87) PCT Pub. No.: WO2005/063485

PCT Pub. Date: Jul. 14, 2005

(65) Prior Publication Data

US 2007/0099017 A1  May 3, 2007

(30) Foreign Application Priority Data

Dec. 26, 2003  (JP) .............................. 2003-433749

(51) Int. Cl.
B32B 7/00 (2006.01)
B32B 7/02 (2006.01)
B32B 27/06 (2006.01)
B32B 27/08 (2006.01)
B32B 27/36 (2006.01)

(52) U.S. Cl. ............... 428/34.9; 428/212; 428/480; 428/910; 428/903.3; 528/308; 528/308.1; 528/308.7

(58) Field of Classification Search .................. None
See application file for complete search history.

(56) References Cited

U.S. PATENT DOCUMENTS 5,128,212 A * 7/1992 Kneale et al. .............. 428/516
5,605,660 A * 2/1997 Buongiorno et al. ....... 264/456
5,932,685 A * 8/1999 Mori et al. ................. 528/272
6,090,898 A * 7/2000 Tsunekawa et al. ........ 525/444
6,426,128 B1 * 7/2002 Kimmel et al. ............ 428/1.6
6,451,445 B1 * 9/2002 Ito et al. .................... 428/480
6,569,515 B2 * 5/2003 Hebrink et al. ............ 428/212
6,663,929 B1 * 12/2003 Tabota et al. .............. 428/35.7
6,720,085 B2 * 4/2004 Ito et al. .................... 428/480
6,958,178 B2 * 10/2005 Hayakawa et al. ........ 428/34.9
2002/0090502 A1 * 7/2002 Ito et al. .................... 428/304.4
2003/0170427 A1 * 9/2003 Ito et al. .................... 428/156
2004/0191493 A1 * 9/2004 Hayakawa et al. ........ 428/220
2005/0196563 A1 * 9/2005 Ito et al. .................... 428/34.1
2006/0057346 A1 * 3/2006 Ito et al. .................... 428/220

FOREIGN PATENT DOCUMENTS

| DE | 4234953 | | 4/1994 |
|---|---|---|---|
| EP | 0928683 | * | 7/1999 |
| JP | 06-047810 | * | 2/1994 |
| JP | 07-323511 | * | 12/1995 |
| JP | 07-323511 A | | 12/1995 |
| JP | 08-156209 A | | 6/1996 |
| JP | 09-267455 A | | 10/1997 |
| JP | 10 138355 A | | 5/1998 |
| JP | 10-138355 A | | 5/1998 |
| JP | 10-244646 A | | 9/1998 |
| JP | 2000-282326 | * | 10/2000 |
| JP | A 2000-282326 | | 10/2000 |
| JP | 2000-309071 | * | 11/2000 |
| JP | 2002-302177 A | | 10/2002 |

* cited by examiner

*Primary Examiner*—Vivian Chen
(74) *Attorney, Agent, or Firm*—Kenyon & Kenyon LLP

(57) ABSTRACT

A heat-shrinkable polyester film having a multi-layer structure of at least two layers, among which at least one layer is a layer containing a PET bottle-recycled material, wherein a heat shrinkage percentage in a maximum shrinkage direction of a 10 cm square sample cut out from the film is 40% or higher, under the condition that the square sample is immersed in hot water of 95° C. for 10 seconds and then immersed in water of 25° C. for 10 seconds, to provide a heat-shrinkable polyester film which has excellent characteristics and which can be produced at a high rate, even when a PET bottle-recycled material is used.

8 Claims, No Drawings

HEAT-SHRINKABLE POLYESTER FILM AND HEAT-SHRINKABLE LABEL

This is a 371 national phase application of PCT/JP2004/019172 filed 22 Dec. 2004, claiming priority to Japanese Patent Application No. JP 2003-433749 filed 26 Dec. 2003, the contents of which are incorporated herein by reference.

TECHNICAL FIELD

The present invention relates to a heat-shrinkable polyester film useful for recycling of PET bottles.

BACKGROUND ART

Polyethylene terephthalate (PET) which has excellent mechanical characteristics, chemical resistance, etc. is used for molded containers, film labels and the like. Particularly in recent years, containers made of PET are widely used for beverage bottles, which are called PET bottles. Along with a drastic increase in the amount of use of the PET bottles, from the viewpoint of the recent environmental problems and resource saving, a movement of recovering used PET bottles and recycling them as a resource is actively carried out. For example, Japanese Patent Laid-Open 2000-282326 discloses an invention of forming recyclable polyester resin products represented by PET bottles into filaments, which are used as fiber products for clothes and for industrial materials.

A PET bottle is wrapped with a film label to exhibit the name of the article, the contents, etc. Since the bottle has to be wrapped in accordance with its three-dimensional shape, usually a heat-shrinkable film label is used. Heretofore, as heat-shrinkable films, drawn films such as polyvinyl chloride films and polystyrene films have been widely used, and in recent years, polyester films have been greatly expected, and the amount of their use is increasing along with the increase in the amount of use of PET bottles.

Therefore, production of heat-shrinkable polyester film labels from recycled PET bottles has been considered, since the cost of the labels will be reduced, and recycling of PET bottles will be achieved. However, a recycled material obtained from the recycled PET bottles is a random mixture of various PET and physical properties such as melt viscosity and molecular weight vary greatly. Accordingly, in production of heat-shrinkable polyester films, if PET bottle-recycled materials are used in an amount of about 45 mass % for example, molecular weight and the like are reduced due to repeated use of PET, whereby the resulting films have low mechanical strength, heat resistance, etc. Further, in film formation of polyester films, it is required to carry out melt extrusion, to rapidly cool the extruded product while it is electrostatically contacted on a casting roll to obtain an undrawn film, and to draw the film in a longitudinal direction and/or in a transverse direction to develop heat shrinkage properties. However, a film using the PET bottle-recycled material in a large amount tends to be inferior in the electrostatic adhesion properties to films obtained from non-recycled PET, whereby the film formation rate is not so high as that of usual films, thus impairing the productivity.

DISCLOSURE OF THE INVENTION

Problem to be Solved by the Invention

It is an object of the present invention to provide a heat-shrinkable polyester film which has excellent characteristics and which can be produced at a high rate, even when a PET bottle-recycled material is used.

MEANS FOR SOLVING PROBLEM

A heat-shrinkable polyester film of the present invention which accomplish the above object is a heat-shrinkable polyester film having a multi-layer structure of at least two layers, among which at least one layer is a layer containing a PET bottle-recycled material, characterized in that a heat shrinkage percentage in a maximum shrinkage direction of a 10 cm square sample cut out from the film is 40% or higher, under the condition that the square sample is immersed in hot water of 95° C. for 10 seconds and then immersed in water of 25° C. for 10 seconds.

According to a preferred embodiment of the present invention, the heat-shrinkable polyester film has a multi-layer structure of at least three layers, wherein both surface layers have a content of the PET bottle-recycled material of 5 mass % or smaller, and at least one layer having a content of the PET bottle-recycled material of 7 mass % or larger is provided as an inner layer other than the surface layers.

The above film preferably has an intrinsic viscosity of 0.62 dl/g or larger and a melting specific resistance at 275° C. of $0.4 \times 10^8$ (Ω·cm) or less. Further, in a case where the above film stored in an environment controlled to a temperature of 30° C. and a relative humidity of 85% for 28 days and then a plurality of the film specimens subjected to a tensile test in a direction orthogonal to the maximum shrinkage direction in a condition of a distance between corresponding chucks of 100 mm, a specimen width of 15 mm, a temperature of 23° C. and a tension test rate of 200 mm/min, the number of the specimens with a breaking extension of 5% or less is preferably 20% or less of all the specimens. The present invention further includes a heat-shrinkable label using the above heat-shrinkable polyester film.

EFFECTS OF THE INVENTION

The heat-shrinkable polyester film of the present invention exhibits favorable heat shrinkage properties and mechanical strength even thought it uses a PET bottle-recycled material. Further, it is also excellent in film formation properties, whereby it will contribute to reduction in cost of heat-shrinkable labels, and the present invention is also useful as PET bottle recycling technique. Accordingly, the heat-shrinkable polyester film and the heat-shrinkable label of the present invention are suitable for various wrapping labels such as labels for PET bottles.

BEST MODE FOR CARRYING OUT THE INVENTION

The heat-shrinkable polyester film of the present invention is a heat-shrinkable polyester film having a multi-layer structure of at least two layers, among which at least one layer is a layer containing a PET bottle-recycled material. A PET bottle-recycled material is a random mixture of various PETs differing in the melt viscosity, the molecular weight, the molecular weight distribution, the monomer composition, the crystallinity, presence or absence of additives such as a polymerization catalyst, etc., and these properties greatly vary with the lot of the recycled material. No stably uniform products can be obtained if the recycled material is used to produce a heat-shrinkable polyester film having a monolayer structure, and a film using a recycled material in an amount of 45 mass % or more has no sufficient mechanical strength nor heat shrinkage properties required for a heat-shrinkable label. However, according to the present invention, in addition to a layer containing a PET bottle-recycled material in a relatively large amount, a layer containing a small amount or no PET bottle-recycled material is provided to constitute a heat-shrinkable polyester film having a multi-layer structure, whereby mechanical strength, heat shrinkage properties, solvent adhesiveness of the film, etc. required for a heat-shrinkable film, can be secured by the additional layer.

Accordingly, in the case of a two-layer heat-shrinkable polyester film for example, it is preferred that one layer is a layer containing a relatively large amount of a PET bottle-recycled material, and the other layer is a layer containing a small amount or no PET bottle-recycled material. In the case of a multilayer structure of at least three layers, it is preferred that both surface layers are layers containing a small amount or no PET bottle-recycled material, and a layer containing a relatively large amount of a PET bottle-recycled material is provided as an inner layer between these surface layers. In the layer containing a small amount of a PET bottle-recycled material, the amount of the recycled material is preferably 7 mass % or less so as to secure sufficient mechanical strength, heat shrinkage properties, solvent adhesiveness, etc. required for a heat-shrinkable film. Further, in the layer containing a relatively large amount of the PET bottle-recycled material, the amount of the recycled material is preferably 7 mass % or more. The larger the amount of the recycled material, the better the PET bottle recycling efficiency. However, if the amount is too large, the strength of the entire film may decrease, or the heat shrinkage properties may vary in some cases, and accordingly the upper limit of the amount is preferably 40 mass %. Most preferred is a heat-shrinkable polyester film having a three-layer structure, wherein both surface layers are layers containing a recycled material of 7 mass % or less, and between the surface layers, one layer containing from 7 to 40 mass % of a PET bottle-recycled material is provided.

The heat-shrinkable polyester film of the present invention must have a heat shrinkage percentage in the maximum shrinkage direction in hot water of 95° C. of 40% or higher. If one having the heat shrinkage percentage less than 40% is used as a label to wrap and shrink around a container such as a bottle, it will not adhere to the container and cause appearance failure. The heat shrinkage percentage in the maximum direction is more preferably 50% or higher, furthermore preferably 60% or higher.

"The heat shrinkage percentage in the maximum shrinkage direction" means a heat shrinkage percentage in a direction along which shrinkage of a sample is largest. The maximum shrinkage direction is determined by the size of a square sample in a longitudinal direction or a widthwise direction. The heat shrinkage percentage in the maximum shrinkage direction in hot water of 95° C. is obtained by immersing a film in hot water of 95° C.±0.5° C. under no load for 5 seconds to induce heat shrinkage, immediately followed by immersion in water of 25° C.±0.5° C. under no load for 10 seconds, measuring the size of the film in longitudinal and widthwise directions, and implementing calculation according to the following equation from the length (10 cm) before shrinkage and the length after shrinkage in a direction along which shrinkage is largest:

heat shrinkage percentage (%)=100×(length before shrinkage−length after shrinkage)/(length before shrinkage).

The heat-shrinkable polyester film of the present invention has as the major constitutional unit an ester unit formed by a polybasic carboxylic acid component and a polyhydric alcohol component. Considering anti-breaking property, strength, heat resistance and the like of the film, it is preferred to select the ester unit so that the content of ethylene terephthalate units is 50% by mole or greater in 100% by mole of constitutional units of the heat-shrinkable polyester film. Accordingly, the content of a terephthalic acid component (terephthalic acid or its ester component) is 50% by mole or greater in 100% by mole of polybasic carboxylic acid components, and the content of an ethylene glycol component is 50% by mole or greater in 100% by mole of polyhydric alcohol components. The content of the ethylene terephthalate units is more preferably 55% by mole or greater, furthermore preferably 60% by mole or greater.

As the polyhydric alcohol to constitute the polyhydric alcohol component in the ester unit, it is possible to use, in combination with the above-described ethylene glycol, an aliphatic diol such as propylene glycol, triethylene glycol, 1,4-butanediol, 1,6-hexanediol, 3-methyl-1,5-pentanediol, neopentyl glycol, 2-methyl-1,5-pentanediol, 2,2-diethyl-1,3-propanediol, 1,9-nonanediol or 1,10-decanediol; an alicyclic diol such as 1,4-cyclohexane dimethanol; trimethylolpropane; glycerin; pentaerythritol; diethylene glycol; dimer diol; polyoxytetramethylene glycol; an alkylene oxide addition product of a bisphenol compound or a derivative thereof, or the like.

Further, as the polybasic carboxylic acid to constitute polybasic carboxylic acid, it is possible to use an aromatic dicarboxylic acid, an ester forming derivative thereof, an aliphatic dicarboxylic acid or the like, in addition to the above terephthalic acid and its ester. Examples of the aromatic dicarboxylic acid include isophthalic acid, naphthalene-1,4- or -2,6-dicarboxylic acid and 5-sodium sulfoisophthalic acid. Examples of the ester derivative of the aromatic dicarboxylic acid or terephthalic acid include derivatives such as a dialkyl ester and a diaryl ester. Examples of the aliphatic dicarboxylic acid include glutaric acid, adipic acid, sebacic acid, azelaic acid, oxalic acid, succinic acid, and an aliphatic dicarboxylic acid usually called dimmer acid. Additionally, hydroxycarboxylic acids such as p-hydroxybenzoic acid, and polybasic carboxylic acids such as trimellitic anhydride and pyromellitic anhydride, may also be used in combination if necessary.

It is also possible to partially use lactones represented by ε-caprolactone despite that lactones do not belong to a polyhydric alcohol nor a polybasic carboxylic acid. Lactones become a unit in which a ring is opened with both ends thereof having an ester bond. It is conceived that a unit derived from one lactone constitutes a carboxylic acid component and an alcohol component. Therefore, in the case of using lactones, the content of a 1,4-cyclohexane dimethanol component and the content of other polyhydric alcohol components are calculated based on a presumption that the sum of the content of the polyhydric alcohol component and the content of the units derived from lactones is 100% by mole. Likewise, the content of the polybasic carboxylic acid component is calculated based on a presumption that the sum of the content of the polybasic carboxylic acid component and the content of the units derived from lactones is 100% by mole.

A component constituting a unit other than the ethylene terephthalate unit is preferably a component which reduces high crystallinity attributable to the ethylene terephthalate unit and with which heat shrinkage properties at low temperature and solvent adhesiveness can be secured. Such a component capable of reducing the crystallinity may, for example, be preferably a polybasic carboxylic acid component such as isophthalic acid, naphthalene-1,4- or -2,6-dicarboxylic acid, or a polyhydric alcohol component such as neopentyl glycol, 1,4-cyclohexane dimethanol or 1,4-butanediol. It is particularly preferred to use either neopentyl glycol or 1,4-cyclohexane dimethanol among them. By use of such a component capable of reducing the crystallinity in combination, the heat shrinkage properties, the anti-breaking property and the solvent adhesiveness of the film can be improved with good balance. Particularly from the viewpoint of the solvent adhesiveness, it is desirable to use for at least surface layers a polyester containing units constituted by at least one of these preferred components as part of the raw material. The content of the units containing such a component capable of reducing the crystallinity is preferably 10% by mole or greater, more preferably 12% by mole or greater, furthermore preferably 15% by mole or greater, in 100% by mole of the constitutional units of the material polyester.

The polyester constituting the heat-shrinkable polyester film can be prepared according to any common melt-polymerization methods, including the so-called direct polymerization method, i.e., polycondensation of oligomers obtained by a direct reaction of a dicarboxylic acid component and a glycol component, and the so-called ester interchange method, i.e., ester interchange reaction of a dimethyester of a dicarboxylic acid and a glycol and subsequent polycondensation, and any method including above may be applicable. The polyester may be obtained by other polymerization processes. As a polymerization catalyst, various conventional catalysts can be used, such as titanium catalysts (e.g. titanium tetrabutoxide), antimony catalysts (e.g. antimony trioxide), germanium catalysts (e.g. germanium dioxide) and cobalt catalysts (e.g. cobalt acetate).

In the present invention, the intrinsic viscosity of the film is preferably 0.62 dl/g or larger. When the intrinsic viscosity of the film is 0.62 dl/g, the anti-breaking property of the film can be secured, and it is possible to reduce occurrence of failure and troubles such as breakage at the time of printing and solvent adhesion processing. In order that the intrinsic viscosity of the film is 0.62 dl/g or larger, it is preferred to control the intrinsic viscosity of the polyester material other than the PET bottle-recycled material. Specifically, considering the decrease of the intrinsic viscosity by melt extrusion, the intrinsic viscosity of the other polyester material is preferably 0.68 dl/g or larger, more preferably 0.70 dl/g or larger, furthermore preferably 0.72 dl/g or larger. The lower limit of the intrinsic viscosity of the film is more preferably 0.63 dl/g, furthermore preferably 0.64 dl/g.

The melting specific resistance of the film of the present invention is preferably $0.4 \times 10^8$ Ω·cm or less at 275° C. The heat-shrinkable film is required to have increased productivity, and is further required to have high transparency in view of quality. In order to increase the productivity, when the melt-extruded film is cooled by a casting roll, the film may be brought into close contact with the roll electrostatically to increase the cooling efficiency thereby to increase the casting speed. The film quality can be improved when the melting specific resistance is low and electrostatic adhesion property is high. Namely, in the case of low electrostatic adhesion property, the film will be insufficiently cooled and solidified, and the air may be locally contained in a space between the casting roll and the film, thereby generating so-called pinner bubbles (stripe defects) on the film surface. However, in the case of excellent electrostatic adhesion property, occurrence of the pinner bubbles can be reduced, whereby favorable film appearance will be achieved. In addition, in a case where the melting specific resistance is sufficiently low and the electrostatic adhesion property is sufficiently high, the thickness of the film can be made uniform. Namely, if the electrostatic adhesion property to the casting roll is low, the thickness of the cast undrawn film raw fabric tends to be non-uniform, and a drawn film obtained by drawing the undrawn film tends to be less uniform in thickness. However, in the case of sufficiently high electrostatic adhesion property, uniform thickness of the drawn film can be achieved.

It is desirable to incorporate an alkaline earth metal compound and a phosphorus-containing compound in the film to control the melting specific resistance of the film within the aforementioned range. Although the melting specific resistance can be reduced only with an alkaline earth metal compound, the melting specific gravity can be remarkably reduced with a phosphorus-containing compound in combination. A reason why the melting specific resistance can be remarkably reduced by use of an alkaline earth metal compound and a phosphorus-containing compound in combination is not clearly understood, but it is conceived that containing a phosphorus-containing compound is effective in suppressing generation of foreign matters and in increasing the quantity of charge carriers.

The content of the alkaline earth metal compound in the film based on alkaline earth metal atoms $M^2$ is preferably at a level of from 20 to 400 ppm (in terms of mass, hereinafter, the unit is the same) for example, and the content of the phosphorus-containing compound based on phosphorous atoms P is preferably at a level of from 20 to 600 ppm for example. Further, the mass ratio ($M^2$/P) of alkaline earth metal atoms $M^2$ to phosphorous atoms P in the film is preferably at a level of from 0.7 to 5.0. In order to further reduce the melting specific resistance of the film, it is desirable to further incorporate from 5 to 100 ppm of alkali metal atoms $M^1$ in the film. An alkali metal compound does not have an action of lowering the melting specific resistance by itself, but is effective in remarkably lowering the melting specific resistance by combined use with the alkaline earth metal compound and the phosphorous-containing compound.

Examples of the alkaline earth metal compound include magnesium hydroxide, magnesium methoxide, magnesium acetate, calcium acetate, strontium acetate and barium acetate, particularly magnesium acetate. Examples of the phosphorus-containing compound include phosphoric acid and trialkyl phosphates (e.g. trimethyl phosphate). Examples of the alkali metal compound include lithium hydroxide, sodium hydroxide, potassium hydroxide, lithium carbonate, sodium carbonate, potassium carbonate, lithium acetate, sodium acetate and potassium acetate, particularly sodium acetate. Since the PET bottle-recycled material does not contain the above additive, it is preferred to add the above additive to the polyester material other than the PET bottle-recycled material to control the amount within the aforementioned preferred range. The time of adding the alkaline earth metal compound, the phosphorous-containing compound and the alkali metal compound is not specifically limited. The addition may be carried out in any step, i.e., before esterification, during esterification, during the period after completion of esterification and before start of polymerization, during polymerization, and after polymerization. Preferably, the addition is carried out after completion of esterification, and more preferably, during the period after completion of esterification and before start of polymerization. If the alkaline earth metal compound and the phosphorous-containing compound (and the alkali metal compound if necessary) are added after completion of esterification, generation of foreign matters can be reduced as compared with a case where the addition is carried out before completion of esterification. Also, fine particles of silica, titanium oxide, kaolin, calcium carbonate or the like or known additives such as an antioxidant, a UV absorbent, an antistatic agent, a colorant and an antibacterial agent may be added to the polyester material according to needs.

The heat-shrinkable polyester film of the present invention has an initial rupture ratio of preferably 20% or lower in a direction orthogonal to the maximum shrinkage direction of the film after stored in an environment controlled to a temperature of 30° C. and a relative humidity of 85% for 28 days. The initial rupture ratio is a proportion (percentage) of specimens with a breaking extension of 5% or less among all the specimens, after carrying out a tensile test in a direction orthogonal to the maximum shrinkage direction with respect to plural film specimens after stored in the above environment under the conditions: a length of each specimen of 200 mm, a distance between corresponding chucks of 100 mm, each specimen of 15 mm in width, a temperature of 23° C., and a tensile test rate of 200 mm/min. If the initial rupture ratio exceeds 20%, when the film after long-term storage is processed, troubles such as breakage and failure will occur due to the decrease in the anti-breaking property of the film. The initial rupture ratio is more preferably 15% or lower, furthermore preferably 10% or lower. In order that the initial rupture ratio is 20% or smaller, it is preferred that the molecules of the film are highly oriented, in addition to adjusting the intrinsic viscosity of the film to be 0.62 dl/g or larger. As the index of the molecular orientation of the film, the heat shrinkage stress (its measuring method will be described hereinafter) in the maximum shrinkage direction is preferably 6 MPa or more, more preferably 7 MPa or more, furthermore preferably 8 MPa or more. The upper limit of the heat shrinkage stress is preferably 22 MPa or less, more preferably 21 MPa or less, furthermore preferably 20 MPa or less. In order to control the molecular orientation (heat shrinkage stress) of the film, it is preferred that the draw ratio and the drawing temperature are under suitable conditions and that the film is formed under a suitable drawing stress.

For production of the heat-shrinkable polyester film of the present invention, the following process is preferred. Namely, chips of the PET bottle-recycled material and chips of the other polyester raw materials are prepared and dried by a dryer such as a hopper dryer or a paddle dryer, or a vacuum dryer. Then, they are suitably mixed and extruded into a film from an extruder at a temperature of from 200 to 300° C. Otherwise, undried chips are extruded into a film in a similar way while removing water in a vented extruder. To form a laminate film having a multi-layer structure, co-extrusion may be employed. In formation of each layer, the amount of the PET bottle-recycled material and the amount of the other polyester raw material are adjusted to be within the above ranges. The PET bottle-recycled material may be chips which are washed and crushed by a known method.

For extrusion, any known method may be employed, such as a T-die method or a tubular method. After extrusion, the extruded product is rapidly cooled on a casting roll to obtain an undrawn film. The "undrawn film" includes a film to which a tension required for film feed in the production step is applied. It is preferred to dispose an electrode between the extruder and the casting roll and applying a voltage between the electrode and the casting roll so that the film is closely contacted to the roll electrostatically, in view of suppressing unevenness of the film thickness.

A drawing treatment is carried out on the undrawn film. The drawing treatment may be carried out continuously after the film is cooled by e.g. the casting roll, or it may be carried out after the cooled film is once wound into a roll. Since it is practical that the maximum shrinkage direction is the film transverse (width) direction in view of the production efficiency, the drawing method will be described below with reference to an example wherein the maximum shrinkage direction is the transverse direction. In a case where the maximum shrinkage direction is the film longitudinal (lengthwise) direction, drawing may be carried out in accordance with a known process, except that the drawing direction in the following method is changed by 90°.

In respect to the uniformization of the variation in thickness of the heat-shrinkable polyester film, it is preferred to carry out a preheating step prior to the drawing step in which the film is drawn in the transverse direction in e.g. a tenter, and in the preheating step, the undrawn film is preferably heated under a low hot-air supply speed so that the heat conductivity coefficient does not exceed 0.00544 J/cm$^2$·sec·° C. (0.0013 cal/cm$^2$·sec·° C.) and the film surface temperature becomes in a range of Tg+0° C. to Tg+60° C.

The film is drawn 2.3 to 7.3 times, preferably 2.5 to 6.0 times in the transverse direction at a temperature in a range of Tg·20° C. to Tg+40° C. Subsequently, the film is heat-treated, while being stretched for 0 to 15% or relaxed for 0 to 15%, at a predetermined temperature in a range of 50° C. to 110° C., and further heat-treated if desired at a predetermined temperature in a range of 40° C. to 100° C., to give a heat-shrinkable polyester film.

In the transverse drawing step, it is preferable to use equipment that can reduce the variation in the film surface temperature. The drawing step includes the preheating before drawing, the drawing, the heat-treating following drawing, the relaxation, and the redrawing, etc. Especially, in the preheating step, the drawing step, and the heat-treating step after the drawing step, it is favorable to control the variation of the surface temperatures of the film measured at any point in a range of the average temperature ±1° C., more preferably in a range of the average temperature ±0.5° C. When the variation in the surface temperature of the film is small, the film will be drawn and heat-treated at the same temperature over the entire length, whereby the heat shrinkage behavior and other physical properties will be uniform. As the equipment that can reduce the variation in the film surface temperature, an inverter-equipped facility capable of suppressing variation in air blowing velocity so as to control the blowing velocity of hot air for heating the film, or a facility capable of suppressing a variation in hot air temperature with use of low-pressure steam of not higher than 500 kPa (5 kgf/cm$^2$) as a heat source, may be mentioned.

The film may also be drawn 1.0 to 4.0 times, preferably 1.1 to 2.0 times in the longitudinal direction, as well as in the transverse direction by the tenter. The film may be biaxially drawn, either by sequential or simultaneous biaxial drawing, and the film may be further redrawn if desired. In the sequential biaxial drawing, the film may be drawn in any of the orders of direction, from longitudinal to transverse, from transverse to longitudinal, from longitudinal to transverse to longitudinal, and from transverse to longitudinal to transverse and so on. When the film is drawn in the longitudinal direction or biaxially drawn, it is also favorable to reduce the variations in the film surface temperature as much as possible in the preheating and drawing steps, similarly to the transverse drawing step.

To suppress internal exothermic heat generation of the film associated with the drawing and reduce the variation in the film temperature in the transverse direction, the heat conductive coefficient in the drawing step is preferably maintained at 0.00377 J/cm²·sec·° C. (0.0009 cal/cm²·sec·° C.) or more, more preferably at 0.00544 to 0.00837 J/cm²·sec·° C. (0.0013 to 0.0020 cal/cm²·sec·° C.).

The thickness of the entire heat-shrinkable polyester film of the present invention is not particularly limited, but the entire thickness is 20 µm or more, preferably 25 µm or more, and 300 µm or less, preferably 200 µm or less, as the heat-shrinkable polyester film for labels. The thickness of each layer is not particularly limited but is preferably 10 µm or more.

To prepare a heat-shrinkable label from the heat-shrinkable polyester film, for example, the heat-shrinkable film before shrinkage is stored in a temperature- and humidity-controlled environment for a predetermined time and taken out. Then, using a known tube-forming apparatus, an adhesive solvent is applied with a predetermined width to a portion slightly inside the edge on one side of the film. Immediately after the application, the film is folded, and both edges are overlaid and bonded to form a tube. The tube is cut into a predetermined length to prepare the heat-shrinkable label of the present invention.

For film adhesion, it is possible to employ melt adhesion of melting part of the film, but it is preferred to use a solvent in view of suppressing e.g. variation in heat shrinkage properties of the label. As the solvent, organic solvents may be used, including aromatic hydrocarbons such as benzene, toluene, xylene and trimethylbenzene; halogenated hydrocarbons such as methylene chloride and chloroform; phenols such as phenol; furans such as tetrahydrofuran; and oxolanes such as 1,3-dioxolane. Among them, 1,3-dioxolane or tetrahydrofuran is preferred in view of high safety. The heat-shrinkable label is attached to a container such as a PET bottle and then heat-shrunk by a known heat shrinking means (such as hot-air tunnel or steam tunnel) to wrap the container.

EXAMPLE

Hereinafter, the present invention will be described in detail with reference to EXAMPLES, but these EXAMPLES are not intended to limit the scope of the present invention, and modifications within the spirit and scope of the present invention are also embraced by the present invention. "ppm" as used in EXAMPLES is based on mass. Physical properties of films obtained in EXAMPLES and COMPARATIVE EXAMPLES were determined according to the following procedures.

(1) Film Composition

A film was dissolved in a mixed solvent of chloroform D (produced by Euriso-top) and trifluoroacetic acid D1 (produced by Euriso-top) at a ratio of 10:1 (volume ratio) to prepare a sample solution, and proton NMR of the resulting sample solution was measured by NMR (GEMINI-200; produced by Varian) under a condition of a temperature of 23° C. and of an integration number of 64, and from proton peak intensities, a proportion of components constituting the film was calculated.

(2) Intrinsic Viscosity

The intrinsic viscosity was determined by the use of Ostwald viscometer at 30±0.1° C. in which accurately weighed 0.1 g of a sample (chip or film) was dissolved in 25 ml of a solvent mixture of phenol: tetrachloroethane at a ratio of 3:2 (by mass ratio). Intrinsic viscosity [η] is calculated according to the following equation (Huggins equation).

$$[\eta] = \lim_{c \to 0}(\eta sp/C)$$ [Equation 1]

$$\eta sp/C = |\eta| + k|\eta|^2 C$$

$$\eta sp = (t - t_0)/t_0$$

Herein, $\eta_{sp}$ is a specific viscosity; $t_o$ is a solvent falling time in Ostwald viscometer; t is a solution falling time in Ostwald viscometer; and C is a concentration of the solution. In real measurement, the intrinsic viscosity was calculated by the following approximate equation, i.e., the Huggins equation wherein k is 0.375.

$$\eta = \eta sp + 1 = t/t0$$ [Equation 2]

$$[\eta] = 1/1.6\{(\eta r - 1) + 3 \times \ln \eta r\}$$

(3) Heat Shrinkage Percentage

A film was cut to give a 10 cm×10 cm square sample. The sample was immersed in hot water at 95° C.±0.5° C. for 10 seconds under no load to induce heat shrinkage, and immediately thereafter immersed in water at 25° C.±0.5° C. for 10 seconds. Subsequently, lengths of the sample in the longitudinal and the transverse directions were determined and the heat shrinkage percentage was calculated according to the following equation. A direction wherein the heat shrinkage was largest was regarded as the maximum shrinkage direction.

Heat shrinkage percentage (%)=100×(length before shrinkage−length after shrinkage)/(length before shrinkage)

(4) Melting Specific Resistance

A pair of electrodes were placed in a melting sample (chip or film) at 275° C., and a voltage of 120V was applied to the electrodes. A flowing electric current was measured, and a melting specific resistance (Si; unit: Ω·cm) was calculated based on the following equation.

$$Si(\Omega \cdot cm) = (A/I) \times (V/io)$$

Herein, A is an area (cm²) of the electrode, I is a distance (cm) between the electrodes, V is a voltage (V), and io is an electric current (A).

(5) Film Formation Properties (Casting)

An electrode in the form of a tungsten wire was arranged between a T-die of an extruder and a casting roll under control of the surface temperature at 30° C., and a voltage ranging from 7 to 10 kV was applied between the electrode and the casting roll. Molten resin was extruded from the T-die at 280° C. to yield a film, and the extruded film was brought into contact with the electrode and cooled while being conveyed on the casting roll to produce a film of 180 µm in thickness (casting speed: 30 m/min.). Pinner bubbles generated on the film surface were observed visually, and generation of pinner bubbles was evaluated based on the following criterion.

○: no pinner bubble was generated.

Δ: generation of pinner bubbles was observed locally.

×: generation of pinner bubbles was observed greatly.

(6) Maximum Heat Shrinkage Stress

The maximum heat shrinkage stress was measured by a tensile test apparatus ("TENSILON", product of TOYO SEIKI Co., Ltd.) equipped with an oven. A sample having 200 mm in length in the maximum shrinkage direction and 20 mm in width was cut from the film before heat shrinkage. Operation of the air blower oven of the tensile test apparatus which has been preheated at 90° C. was suspended, and then, the sample was loosely placed in the oven with a distance between corresponding chucks of 100 mm so that the ratio of the length of the sample between corresponding chucks and the distance between corresponding chucks would be 1:0.9. After placing the sample in the oven, the door of the oven was promptly closed and feeding hot air (hot air at 90° C., blowing velocity at 5 m/sec. blowing from three directions, i.e., depthwise, leftward, and rightward directions) was started, and the shrinkage stress was detected and measured, and the maximum value obtained from the measurement chart was set as the maximum heat shrinkage stress (MPa).

(7) Initial Rupture Ratio

A tensile test was performed in a direction orthogonal to the maximum shrinkage direction of the heat-shrinkable polyester film after stored in an environment at 30° C. at a relative humidity of 85% for 28 days, according to JIS K 7127. The number of specimens was 20. The test was carried out under the conditions: each specimen having 200 mm in length, a distance between corresponding chucks of 100 mm, each specimen having 15 mm in width, a temperature of 23° C., and a tensile test rate of 200 mm/min. The number of specimens which were torn before the drawing by 5% or less was counted, and the percentage (%) of the torn specimens relative to all the specimens (20 pieces) was calculated as an initial rupture ratio (%).

(8) Solvent Adhesiveness

A film was subjected to bond-processing and formed into a tube using 1,3-dioxolane, the obtained tube was cut into a width of 15 mm in a direction orthogonal to the flow direction at the time of bond-processing to prepare a sample, and the adhesive strength at the bonded portion was evaluated. Evaluation was made under the following criteria. x:a part of the bonded portion was easily separated by the hand, Δ: the adhered portion was separated by the hand with weak resistance, and ○: no portion was easily separated by the hand. A sample rated ○ is determined as acceptable.

(9) Metal Component

The contents of Na, Mg and P contained in the sample were measured according to the below-mentioned method.

[Na] 2 g of the sample was put in a crucible of platinum, and incinerated at a temperature of from 500 to 800° C. Thereafter, 5 mL of hydrochloric acid (concentration: 6 mol/L) added to the incinerated substance, then obtained mixture was subjected to evaporation and dried into solid. The obtained residues were dissolved in 10 mL of hydrochloric acid in a concentration of 1.2 mol/L, and the concentration of Na is measured with use of an atomic absorption spectrophotometer ("AA-640-12", product of Shimadzu Corporation) based on a calibration curve.

[Mg] 2 g of the sample was put in a crucible of platinum, and incinerated at a temperature from 500 to 800° C. Thereafter, 5 mL of hydrochloric acid (concentration: 6 mol/L) added to the incinerated substance, then obtained mixture was subjected to evaporation and dried into solid. The obtained residues were dissolved in 10 mL of hydrochloric acid in a concentration of 1.2 mol/L, and the concentration of Mg was measured with use of an ICP spectrophotometer ("ICPS-200", product of Shimadzu Corporation) based on a calibration curve.

[P] Orthophosphoric acid was derived from the phosphorus component in the sample by either one of the following three methods (A) through (C). The orthophosphoric acid and molybdate were reacted with each other in sulfuric acid (concentration: 1 mol/L). After yielding phosphomolybdic acid, hydrazine sulfate was added to reduce. The concentration of heteropolyacid salt (blue) obtained by the reduction was calculated by measuring the absorbance of the substance at 830 nm with use of an absorption spectrophotometer ("UV-150-02", product of Shimadzu Corporation) based on a calibration curve.

(A) dry-incinerating the sample and sodium carbonate in a crucible of platinum;
(B) wet-decomposing in a reaction system of sulfuric acid, nitric acid, and perchloric acid; and
(C) wet-decomposing in a reaction system of sulfuric acid and perchloric acid Experiment 1

Using for an inner layer (core layer) a polyester resin obtained by mixing 55 mass % of polyester B, 10 mass % of polyester C and 35 mass % of polyester D, and for both surface layers (skin layers) a polyester resin obtained by mixing 35 mass % of polyester A, 55 mass % of polyester B and 10 mass % of polyester C, co-extrusion from a monoaxial extruder equipped with a T-die was carried out at 280° C., followed by rapid cooling to obtain an undrawn film (thickness: 195 μm) having a three-layer structure of skin layer/core layer/skin layer. The undrawn film was preheated at 88° C. for 10 seconds, then drawn 3.9 times in the transverse direction at 80° C. by using a tenter and then subjected to heat treatment at 78° C. for 10 seconds to obtain a heat-shrinkable polyester film 1 having a thickness of 40 μm (thicknesses of skin layer/core layer/skin layer:10 μm/20 μm/10 μm). In the respective steps in the drawing process, the variations in the film surface temperatures were within a range of ±0.5° C. The compositions of the polyester resins used are shown in Table 1. In Table 1, TPA represents terephthalic acid, EG ethylene glycol, BD 1,4-butanediol, NPG neopentyl glycol, and CHDM 1,4-cyclohexane dimethanol. The contents of inorganic component (Na, Mg, P, Ti, Co and Sb) are represented in terms of the concentrations of the respective corresponding atoms (unit: ppm, in terms of mass). The respective inorganic components are derived from the following compounds.

Na: mainly derived from sodium acetate

Mg: mainly derived from magnesium acetate tetrahydrate

P: mainly derived from trimethylphosphate

The structure of each layer and the composition of the obtained film are shown in Table 2, and the characteristics of the film are shown in Table 3.

Experiment 2

Using for a core layer a polyester resin obtained by mixing 75 mass % of polyester B, 10 mass % of polyester C and 15 mass % of polyester D, and for both skin layers a polyester resin obtained by mixing 15 mass % of polyester A, 75 mass % of polyester B and 10 mass % of polyester C, co-extrusion from a monoaxial extruder equipped with a T-die was carried out at 280° C., followed by rapid cooling to obtain a undrawn film having a three-layer structure of skin layer/core layer/skin layer. The undrawn film was preheated at 88° C. for 10 seconds, then drawn 5.2 times in the transverse direction at 75° C. and then subjected to heat treatment at 65° C. for 10 seconds to obtain a heat-shrinkable polyester film 2 having a thickness of 40 μm (thicknesses of skin layer/core layer/skin layer:10 μm/20 μm/10 μm). In the respective steps in the drawing process, the variations in the film surface temperatures were within a range of ±0.5° C. The structure of each layer and the composition of the film are shown in Table 2, and the characteristics of the film are shown in Table 3.

Experiments 3 to 5

A heat-shrinkable polyester film having a thickness of 40 μm (thicknesses of skin layer/core layer/skin layer:10 μm/20 μm/10 μm) was obtained in the same manner as in Experiment 1 except the composition of the polyester resin was changed as identified in Table 2. The structure of each layer and the composition of the film are shown in Table 2, and the characteristics of the film are shown in Table 3.

TABLE 1

| | Charged material composition (mole %) | | | | | Alkali metal $M^1$ (ppm) | Alkaline earth metal $M^2$ (ppm) | Phosphorus atom P (ppm) | Mass ratio $M^2/P$ | Melting specific resistance ($\Omega \cdot$ cm) | Intrinsic viscosity (dl/g) |
|---|---|---|---|---|---|---|---|---|---|---|---|
| | Polybasic carboxylic acid | Polyhydric alcohol | | | | | | | | | |
| Polyester | TPA | EG | BD | NPG | CHDM | | | | | | |
| A | 100 | 100 | — | — | — | — | 81 | 58 | 1.40 | $0.20 \times 10^8$ | 0.70 |
| B | 100 | 70 | — | 30 | — | 20 | 180 | 78 | 2.31 | $0.18 \times 10^8$ | 0.70 |
| C | 100 | — | 100 | — | — | — | 39 | — | — | $9.91 \times 10^8$ | 1.20 |
| D | "Clear pellet", product of Yono PET bottle recycle K.K. | | | | | — | — | — | — | $2.31 \times 10^8$ | 0.65 |
| E | 100 | 70 | — | — | 30 | 20 | 180 | 78 | 2.31 | $0.15 \times 10^8$ | 0.70 |

TABLE 2

| | | Experiment 1 | | Experiment 2 | | Experiment 3 | | Experiment 4 | | Experiment 5 | |
|---|---|---|---|---|---|---|---|---|---|---|---|
| | | Skin layer | Core layer | Skin layer | Core layer | Skin layer | Core layer | Skin layer | Core layer | Skin layer | Core layer |
| Polyester mixture composition (mass %) | Polyester A | 35 | — | 15 | — | — | — | 25 | — | 15 | — |
| | Polyester B | 55 | 55 | 75 | 75 | 55 | 55 | 65 | 45 | — | — |
| | Polyester C | 10 | 10 | 10 | 10 | 10 | 10 | 10 | 10 | 10 | 10 |
| | Polyester D | — | 35 | — | 15 | 35 | 35 | — | 45 | — | 15 |
| | Polyester E | — | — | — | — | — | — | — | — | 75 | 75 |
| Film composition (mole %) | Polybasic carboxylic acid component | TPA | 100 | | 100 | | 100 | | 100 | | 100 | |
| | Polyhydric alcohol component | EG | 72.1 | | 65.9 | | 72.0 | | 72.0 | | 63.3 | |
| | | BD | 9.4 | | 9.4 | | 9.4 | | 9.4 | | 9.5 | |
| | | NPG | 16.6 | | 22.6 | | 16.6 | | 16.6 | | — | |
| | | CHDM | — | | — | | — | | — | | 25.1 | |
| | | DEG | 2.0 | | 2.1 | | 2.1 | | 2.1 | | 2.1 | |
| Alkali metal $M^1$ (ppm) | | | 11 | | 15 | | 11 | | 11 | | 15 | |
| Alkaline earth metal $M^2$ (ppm) | | | 117 | | 147 | | 103 | | 103 | | 147 | |
| Phosphorus atom P (ppm) | | | 53 | | 63 | | 43 | | 50 | | 63 | |
| Mass ratio $M^2/P$ | | | 2.21 | | 2.33 | | 2.40 | | 2.06 | | 2.33 | |

TABLE 3

| | Experiment 1 | Experiment 2 | Experiment 3 | Experiment 4 | Experiment 5 |
|---|---|---|---|---|---|
| Film intrinsic viscosity (dl/g) | 0.651 | 0.658 | 0.605 | 0.612 | 0.657 |
| Heat shrinkage percentage (%) | 65 | 78 | 64 | 63 | 77 |
| Film melting specific resistance ($\Omega \cdot$ cm) | $0.27 \times 10^8$ | $0.28 \times 10^8$ | $0.56 \times 10^8$ | $0.49 \times 10^8$ | $0.28 \times 10^8$ |
| Casting | ◯ | ◯ | Δ | Δ | ◯ |
| Maximum heat shrinkage stress (MPa) | 7.5 | 17.5 | 6.3 | 6.7 | 15.7 |
| Initial rupture ratio (%) | 0 | 0 | 100 | 50 | 0 |
| Solvent adhesiveness | ◯ | ◯ | ◯ | ◯ | ◯ |

The invention claimed is:

1. A heat-shrinkable polyester film having a multi-layer structure of at least two layers, among which at least one layer is a layer containing a PET bottle-recycled material, wherein a heat shrinkage percentage of a 10 cm square sample cut out from the film in a maximum shrinkage direction is 40% or higher, under the condition that the square sample is immersed in hot water of 95° C. for 10 seconds and then immersed in water of 25° C. for 10 seconds, and the film contains as polyester components constituting the film, 50% by mole or greater of a terephthalic acid component in 100% by mole of polybasic carboxylic acid components, and the content of an ethylene gilycol component is 50% by mole or greater in 100% by mole of polyhydric alcohol components.

2. The heat-shrinkable polyester film as claimed in claim 1 which has a multi-layer structure of at least three layers, wherein both surface layers have a content of the PET bottle-recycled material of 7 mass % or smaller, and at least one layer having a content of the PET bottle-recycled material of 7 mass % or larger is provided as an inner layer other than the surface layers.

3. The heat-shrinkable polyester film as claimed in claim 2, wherein the film has an intrinsic viscosity of 0.62 dl/g or larger.

4. The heat-shrinkable polyester film as claimed in claim 1, wherein the film has an intrinsic viscosity of 0.62 dl/g or larger.

5. The heat-shrinkable polyester film as claimed in claim 1, wherein the film contains an alkaline earth metal and a phosphorus compound, the content of the alkaline earth metal $M^2$ is from 20 to 400 ppm and the content of phosphorus atoms P is from 20 to 600 ppm in the film.

6. The heat-shrinkable polyester film as claimed in claim 1, wherein the film has a melting specific resistance at 275° C. of $0.4 \times 10^8$ ($\Omega \cdot cm$) or less.

7. The heat-shrinkable polyester film as claimed in claim 1, wherein when the film stored in an environment controlled to a temperature of 30° C. and a relative humidity of 85% for 28 days and then a plurality of the film specimens are subjected to a tensile test in a direction orthogonal to the maximum shrinkage direction in a condition of a distance between corresponding chucks of 100 mm, a specimen width of 15 mm, a temperature of 230° C. and a tension test rate of 200 mm/min, the number of specimens with a breaking extension of 5% or less is 20% or less of all the specimens.

8. A heat-shrinkable label which uses the heat-shrinkable polyester film defined in claim 1.

* * * * *

UNITED STATES PATENT AND TRADEMARK OFFICE
CERTIFICATE OF CORRECTION

PATENT NO.         : 7,344,765 B2
APPLICATION NO. : 10/583743
DATED              : March 18, 2008
INVENTOR(S)        : Hayakawa et al.

It is certified that error appears in the above-identified patent and that said Letters Patent is hereby corrected as shown below:

Column 15,
In Claim 1, line 13, replace "gilycol" with --glycol--.

Signed and Sealed this

Ninth Day of June, 2009

JOHN DOLL
*Acting Director of the United States Patent and Trademark Office*